Jan. 1, 1929.

N. TRBOJEVICH

FRUID OPERATED VALVE

Filed Nov. 8, 1926

Inventor
Nikola Trbojevich
By Whittemore Hulbert
Whittemore & Belknap
Attorneys

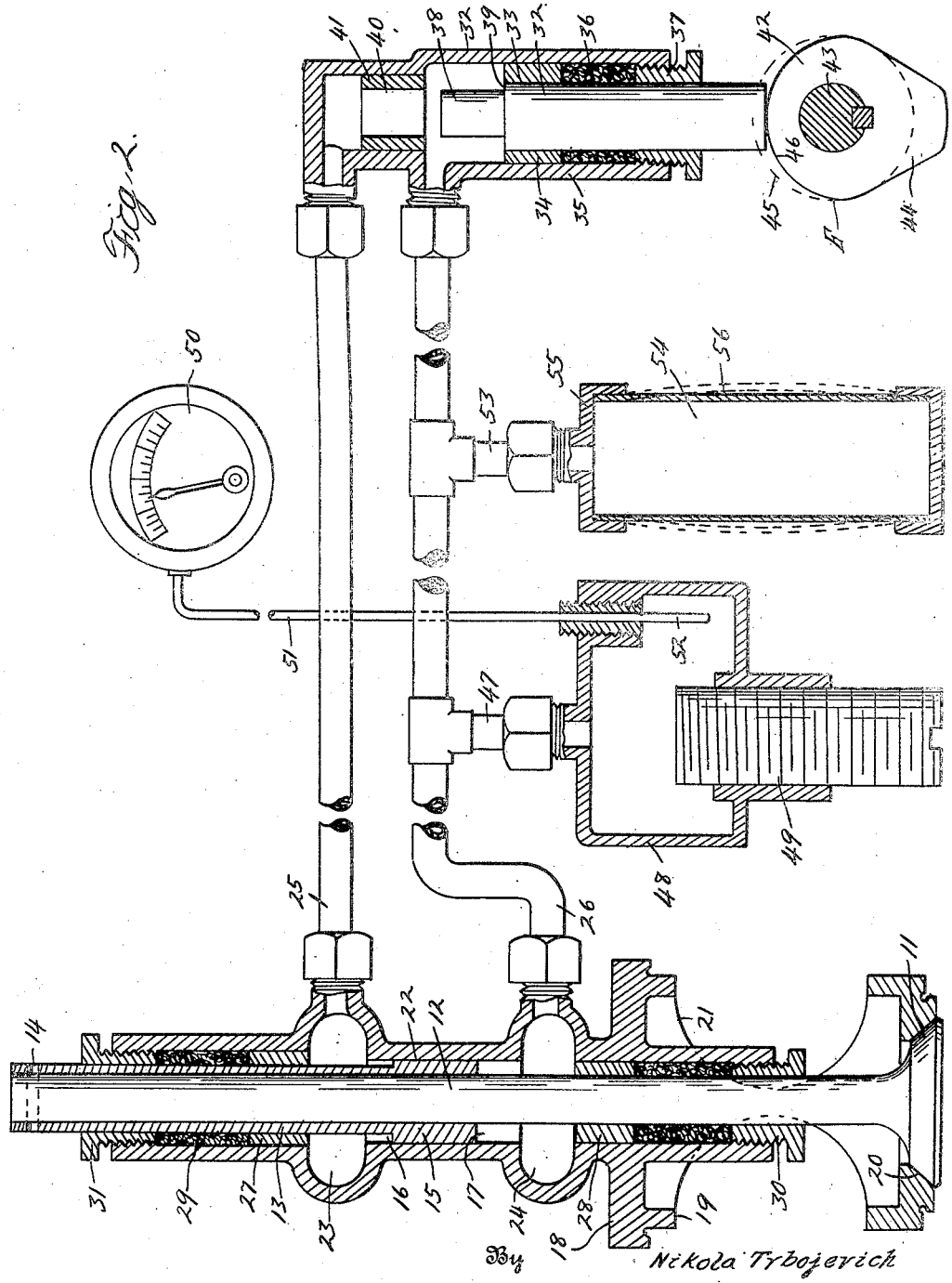

Patented Jan. 1, 1929.

1,696,984

UNITED STATES PATENT OFFICE.

NIKOLA TRBOJEVICH, OF HIGHLAND PARK, MICHIGAN.

FLUID-OPERATED VALVE.

Application filed November 8, 1926. Serial No. 147,154.

The invention relates to a hydraulic system for transmitting motion to mechanical devices through hydraulic pressures, and more particularly the invention relates to a novel system of hydraulically operated valves, such for instance as may be used for controlling the intake and exhaust ports of an internal combustion engine.

The primary object of the invention is to render the hydraulic principle available for practical use in operating the valves of high speed multi-cylinder engines, such as automobile and aviation engines. This I have accomplished by utilizing a hydraulic system having the following properties and advantages: First, the valves are positively operated by hydraulic pressure both in the opening and the closing strokes; second, very high fluid pressures are employed without danger of injuring the valves or the seats because of the principle of differential pressures employed in the system and because the system is self-compensating for leakages past the pistons; third, the seating pressures of all cooperating valves are centrally equalized and adjustable, thus doing away with individual valve springs; fourth, the valve lifts are equalized and are independent of the location and condition of the valve seats; fifth, the entry of air bubbles in the fluid conduits is prevented because the fluid is at all times above atmospheric pressure even when the engine is not operating; sixth, the system is silent in operation because the push rods seat firmly against the cams without any clearance.

In the drawings:

Figure 2 shows sectional views of the various mechanisms connected together to form the fluid system.

Figure 1:
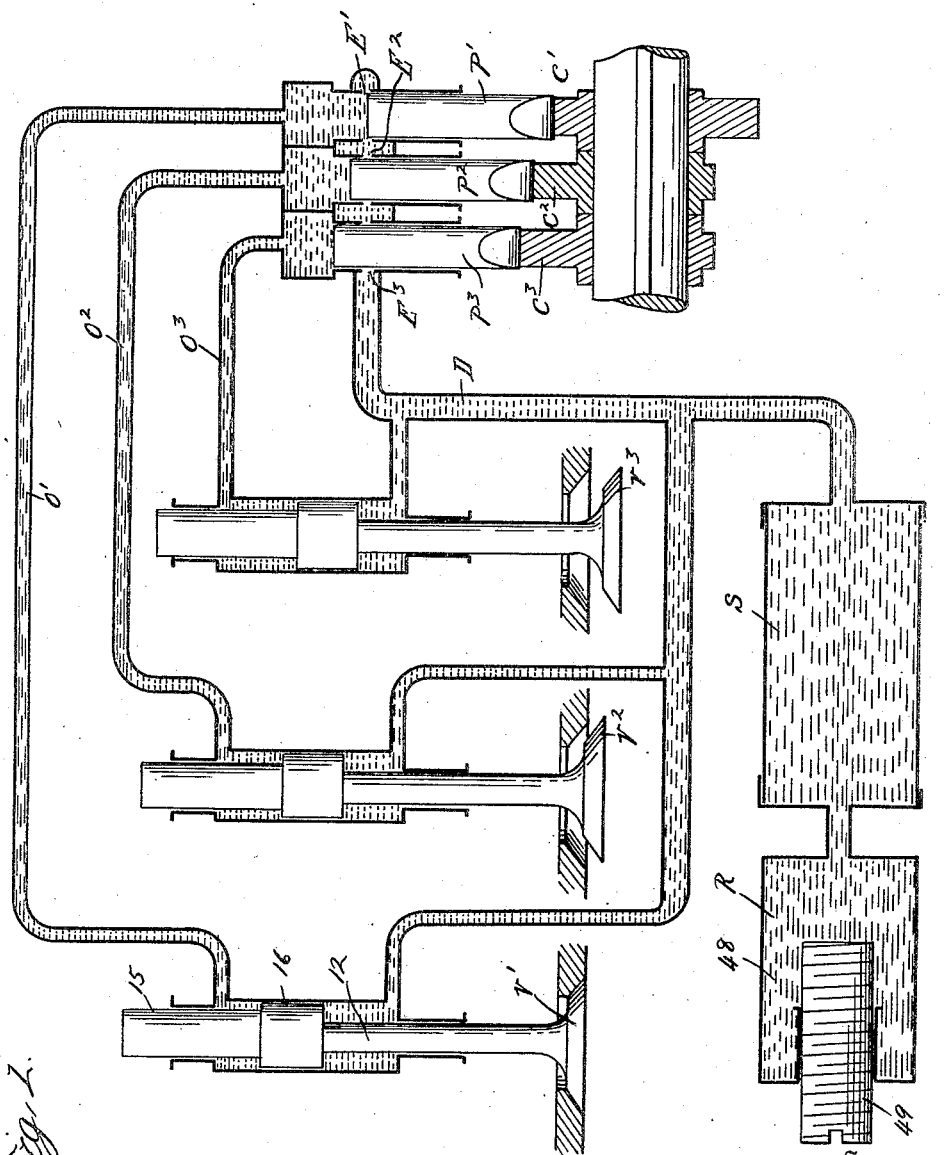
Figure 1 is a diagrammatic representation of the fluid system arranged to operate a plurality of valves.

Referring now to the construction illustrated in Figure 2, the valve 11 is preferably integral with the valve stem 12 and the stem carries a sleeve 13 secured thereto by a removable pin 14. The sleeve has a cylindrical head 15 forming the upper and lower piston areas 16 and 17 which are of predetermined cross sectional areas, differing from each other by a predetermined amount. 18 represents generally a valve housing, which as shown is provided with a hollow cylindrical portion 19 forming a gas chamber. The cylindrical member is provided with a valve seat 20 and has suitable apertures 21 forming gas passageways leading to the interior thereof. The valve housing is provided with a central cylindrical passageway extending therethrough and forming a cylinder 22 closely fitting the piston head 15. On opposite sides of the piston head 15 the valve housing is provided with ring-like enlargements 23 and 24 respectively, which lead to the pressure and release conduits 25 and 26 respectively. The valve stem is packed in the valve housing by providing the bushings 27 and 28, the packing material 29 and the stuffing caps 30 and 31, the latter being threaded into the valve housing.

The actuating mechanism comprises a reciprocable plunger 32 slidable in a cylinder 33, the latter being formed by a bushing 34 arranged in a cylindrical housing 35. The plunger is packed in the housing by means of packing 36 held in position by the packing cap 37. The plunger has a projecting end portion 38 of smaller diameter forming an annular shoulder 39, the projecting portion being adapted to slide into a cylinder 40 formed by a bushing 41. The cylinder 40 communicates with the pressure conduit 25, while the cylinder 33 communicates with the release conduit 26. For actuating the plunger 32 there is a cam 42 keyed to a cam shaft 43, the latter being rotated by any suitable source of power. The cam has a nose portion 44 rising above the base circle 45 and has the remainder 46 of its contour below the base circle. The arrangement of the cam and plunger is such that when the plunger engages the portion 46 of the cam, the end 38 of the plunger is withdrawn from the cylinder 40, affording communication between pressure conduit 25 and return conduit 26 through the equalizing gap E. When the base circle portion of the cam engages the plunger, the end 38 just enters the cylinder 40 and when the nose 44 engages the plunger, the end 38 operates within the cylinder 40.

The return conduit 26 communicates through a branch conduit 47 with a fluid reservoir 48, which as shown is provided with an adjusting screw 49 for increasing the pressure on the fluid within the same. The pressure within the reservoir is indicated on the gauge 50 through the medium of a conduit 51 leading to a manometer bulb 52 within the fluid reservoir. The return conduit 26 is also connected through a branch pipe 53 with a spring box 54, the function of which is to maintain a resilient pressure on the fluid in the return conduit and to provide for the displacement of the fluid in the system. The spring box as shown comprises the rigid ends 55 between which are held the thin flexible sides 56 forming a container of rectangular cross section. The arrangement is such that the sides of the spring box are deformed outwardly by reason of increased fluid pressure taking the position indicated in the dotted lines.

Figure 1 is a diagrammatic representation of the fluid system arranged to operate a plurality of valves V', V² and V³ by means of a series of cams C', C² and C³ and the corresponding plungers P', P² and P³. The valves are normally held closed by fluid pressure from the common return conduit D and are respectively opened by the pressure built up in the separate opening conduits O', O² and O³. The common return conduit D communicates with a suitable spring box S and also an adjustable reservoir R. The construction of the various parts of the mechanism illustrated in Figure 1 may be similar to that more specifically shown in Figure 2. One difference, however, may be noted, namely, that the ends of the plungers P', P² and P³, when in position to close the respective equalizing gaps E', E² and E³, are no longer subjected to the pressure in the return conduit D. It is to be understood that the actuating mechanism shown in Figure 2 can equally as well be incorporated in a system where a plurality of valves are being actuated and such a construction is preferred for the reasons hereinafter given.

In constructing the various parts of the mechanism it is necessary that the various piston areas be carefully predetermined in order that the system will operate under pressures, which will insure continuous positive operation. The following discussion will show the relationship between the various parts, so that it will be a simple matter to select the desired values in adapting the system to any specific use.

If the area corresponding to the diameter of the piston head 15 is denoted by $A'$, the area corresponding to the diameter of the sleeve 13 be denoted as $A^2$ and the area of the valve stem 12 be denoted as $A^3$, then the effective area of the piston surface 17 is equal to $A^1 - A^3$. Similarly, the effective area of surface 16 is equal to $A^1 - A^2$. The difference between these two piston areas is therefore $A^2 - A^3$. Thus when there is an initial pressure on the system denoted as $p_0$ and the equalizing gap E is open, the valve is held against its seat by a force $y$ indicated by the following equation:

$$y = (A^2 - A^3) p_0 \quad (1)$$

Thus it will be noted that the seating pressure in the system depends upon the differential area between the surfaces 16 and 17, but not on the area of the piston head 15. Furthermore the pressure can be accurately adjusted by regulating the pressure by the adjusting screw 49 in the reservoir 48.

The valve V² in Figure 1 is shown in half open position since the actuating cam C² has closed the equalizing gap E² and the opening circuit O² is now separate from the common return circuit D. If the pressure in the circuit O² is denoted as $p$ while the pressure in the return conduit D is still $p_0$ and if $x$ be the force opening the valve, it is evident that the value of $x$ will be represented by the following equation:

$$x = (A^1 - A^2) p - (A^1 - A^3) p_0 \quad (2)$$

During the opening stroke the value of the force $x$ is positive and during the closing stroke it is negative. Thus at the end of the opening stroke the value of $x$ will be equal to zero. Let the corresponding value of $p$ in that case be denoted as $p_1$ and it follows that $$p_1 = \frac{A_1 - A_3}{A_1 - A_2} p_0 \quad (3)$$

that is, the value of $p$ is still greater than $p_0$.

During the closing stroke it is conceivable that $p$ equals zero, but it certainly cannot be less than zero. This gives an opportunity to calculate the maximum closing force $z$ by substituting in Equation 2 $p = o$ and equating $z = -x$ we have:

$$z = (A^1 - A^3) p_0 \quad (4)$$

The Equations 1 to 4 inclusive enable us to properly determine the areas $A^1$, $A^2$ and $A^3$ and the initial pressure $p_0$. It is desirable that the force $y$ be comparatively small as it is injurious to the valves to strike them hard against their seats. On the other hand, the forces $x$ and $z$ should be considerable, especially so in the high speed engines in which the inertia of the valve and the fluid column must be overcome in a very short time. It is seen that in this system it is possible so to determine said forces because the force $y$ is independent of the main piston diameter as it has been already stated. For this reason, the differential action of the plungers must be considered as a great practical advantage of this system.

The operation of the system will best be understood by referring first to Figure 2. The valve 11 is shown in a closed position pressing against the seat 20 with the force $y$, and the conduits 25 and 26 are filled with fluid at a pressure $p_0$. The contour of the cam 42 is such that the plunger 32 is spaced from the cylinder 40, opening the equalizing gap E between the conduits 25 and 26. If the cam is rotated until the point E arrives at the center line of the plunger, the said plunger will just enter the cylinder 40, thereby closing the equalizing gap E. As the rotation of the cam continues the conduit 25 will be separated from the conduit 26 and the pressure in the former will be suddenly increased at a much greater ratio than the increase in the conduit 26. This will cause the valve 11 to leave its seat and move through the distance of the lift of the valve. The area of the plunger 38 should be equal to $A^1 - A^2$ for a one-to-one ratio of the rise of the cam to the lift of the valve. However, any other convenient ratio may be employed if desired.

When the valve 11 has reached the end of its opening stroke, the cam will no longer push the plunger upward, but will permit it to come back gradually. There are two forces compelling the plunger 32 to return, the pressure of the fluid in the conduit 25 and the pressure $p_0$ in the return conduit 26, the latter acting upon the shoulder 39.

The compensation for volume expansions due to heat, and fluid losses due to leakages, will now be discussed. It is apparent that the circuit 26 is fully protected against volume discrepancies because it possesses a resiliently displaceable spring box 54. Similarly the circuit 25 is protected whenever it is in communication with the circuit 26 through the equalizing gap E. To prove that the circuit 25 is protected at all times even when it is separated from the circuit 26, it is sufficient to mention that according to the basic idea of this system the valve 11 must always be open whenever the circuit 25 is closed. The valve 11 being open it is evident that it must be subject to the spring pressure from the circuit 26, which spring pressure is necessarily transmitted to the circuit 25 as there is no other member to take up that pressure. Thus all internal leakages past the operating pistons are immediately recovered by one circuit and passed on to the other circuit either through the equalizing gap E when the valve is closed or by the slight displacement of the valve when it is open and all external leakages are made up from the reservoir. The effect of the leakage will be therefore to reduce the lift of the valve in proportion to the loss, but will not impair the correct operation of the valves, nor will it permit air bubbles to enter as long as the reservoir holds out.

What I claim as my invention is:

1. In a valve operating mechanism, the combination with a valve seat and a valve movable relative thereto, of a differential piston connected to said valve and fluid actuated means for positively opening and closing said valve, said means always maintaining a positive pressure on both sides of said piston.

2. In a valve operating mechanism, the combination with a valve seat and a valve movable relative thereto, of a piston connected to said valve having opposite areas subjected to fluid pressure, one area being larger than the other and tending to close the valve, means for normally maintaining equal pressure on the opposite areas of said piston, whereby the valve is seated by fluid pressure, and means for periodically exerting a greater fluid pressure on the smaller area than the larger to open said valve.

3. In a valve operating mechanism, the combination with a valve seat and a valve movable relative thereto, of a cylinder, a differential piston in said cylinder connected to said valve and having unequal opposite areas subjected to fluid pressure, the larger area tending to close said valve, an actuating cylinder, fluid conduits connecting said cylinder with the opposite areas of said piston, a plunger movable in said actuating cylinder, and means for advancing said plunger to shut off communication between said conduits and increase the pressure on the smaller area of said piston.

4. In a valve operating mechanism, the combination with a valve seat and a valve movable relative thereto, of a cylinder, a differential piston in said cylinder connected to said valve and having unequal opposite areas subjected to fluid pressure, the larger area tending to close said valve, a fluid circuit comprising two conduits extending from opposite sides of said piston and normally in communication with each other, an actuating cylinder connecting said two conduits, a plunger having two portions respectively subjected to the pressure in said two conduits, and means for advancing said plunger to cut off communication between said conduits.

5. In a valve operating mechanism, the combination with a valve seat and a valve movable thereto, of a cylinder, a piston in said cylinder connected to said valve and having unequal opposite areas subjected to fluid pressure, the larger area tending to close said valve, an actuating cylinder having two normally communicating conduits leading respectively to opposite sides of said piston, a plunger movable in said cylinder to close communication between said conduits, said plunger having one area continuously subjected to the fluid in one conduit and another area continuously subjected to the fluid in the other conduit.

6. In a valve operating mechanism, the combination with a valve seat and a valve movable relative thereto, of a cylinder, a differential work piston in said cylinder connected to said valve and having unequal opposite areas subjected to fluid pressure, the larger area tending to close said valve, an operating plunger, an opening fluid circuit between said plunger and said piston, a closing fluid circuit between said plunger and said piston, resiliently displaceable means in said closing circuit, means for moving said plunger to exert a pressure in said opening circuit in excess of that in said closing circuit, and an equalizing gap between said circuits adapted to be opened upon retraction of said plunger.

7. In a valve operating mechanism, the combination with a plurality of valves, of separate pistons connected to each of said valves, individual pressure conduits leading from each of said pistons, a common return conduit connected with the opposite sides of each of said pistons, separate means for each of said pressure conduits normally connecting the same with said return conduit, and separately operated plungers for increasing the pressures in the respective pressure conduits.

8. In a valve operating mechanism, the combination with a plurality of valves and separate differential fluid motors for each valve, of separate plunger mechanism for operating each valve, separate conduits connecting the respective plungers with the fluid motors, a common return fluid conduit connected to all of said fluid motors, and means for periodically connecting each pressure conduit to said fluid return conduit.

In testimony whereof I affix my signature.

NIKOLA TRBOJEVICH.